United States Patent
Ohlin

[15] 3,659,884
[45] May 2, 1972

[54] LATCH FOR DETACHABLY CONNECTING STRUCTURAL PARTS

[72] Inventor: Bror Eric Gustav Ohlin, Saffle, Sweden
[73] Assignee: Aktiebolaget Electrolux, Stockholm, Sweden
[22] Filed: May 7, 1970
[21] Appl. No.: 35,311

[30] Foreign Application Priority Data

May 9, 1969 Sweden.................................6595/69

[52] U.S. Cl.....................287/189.36R, 211/177, 211/182, 287/20.924
[51] Int. Cl..........................................F16b 3/00, F16b 7/22
[58] Field of Search............287/20.924, 189.36 R; 211/176, 211/177, 182, 148; 248/243, 223; 108/108; 85/5 P; 24/73 RM, 221

[56] References Cited

UNITED STATES PATENTS 1,772,835   8/1930   Jurad...............................85/5 P UX

FOREIGN PATENTS OR APPLICATIONS 15,005      1912    Great Britain.........................85/5 P
1,154,684   6/1969  Great Britain.........................85/5 P Primary Examiner—David J. Williamowsky
Assistant Examiner—Wayne L. Shedd
Attorney—Edmund A. Fenander

[57] ABSTRACT

A pair of structural parts having walls formed with elongated slots of generally similar shape are detachably connected by a latch including a body and a catch separated therefrom by a connecting neck portion. When the walls of the parts overlie one another and the openings therethrough are in alignment and coincide, the latch is in an operative position after the catch has been moved through both of the openings in the parts and a projecting wall section of the body has been moved into the opening of one part. When in such operative position the latch functions to detachably connect the parts after they have been moved relative to one another through an angle of 90°.

5 Claims, 14 Drawing Figures

Patented May 2, 1972

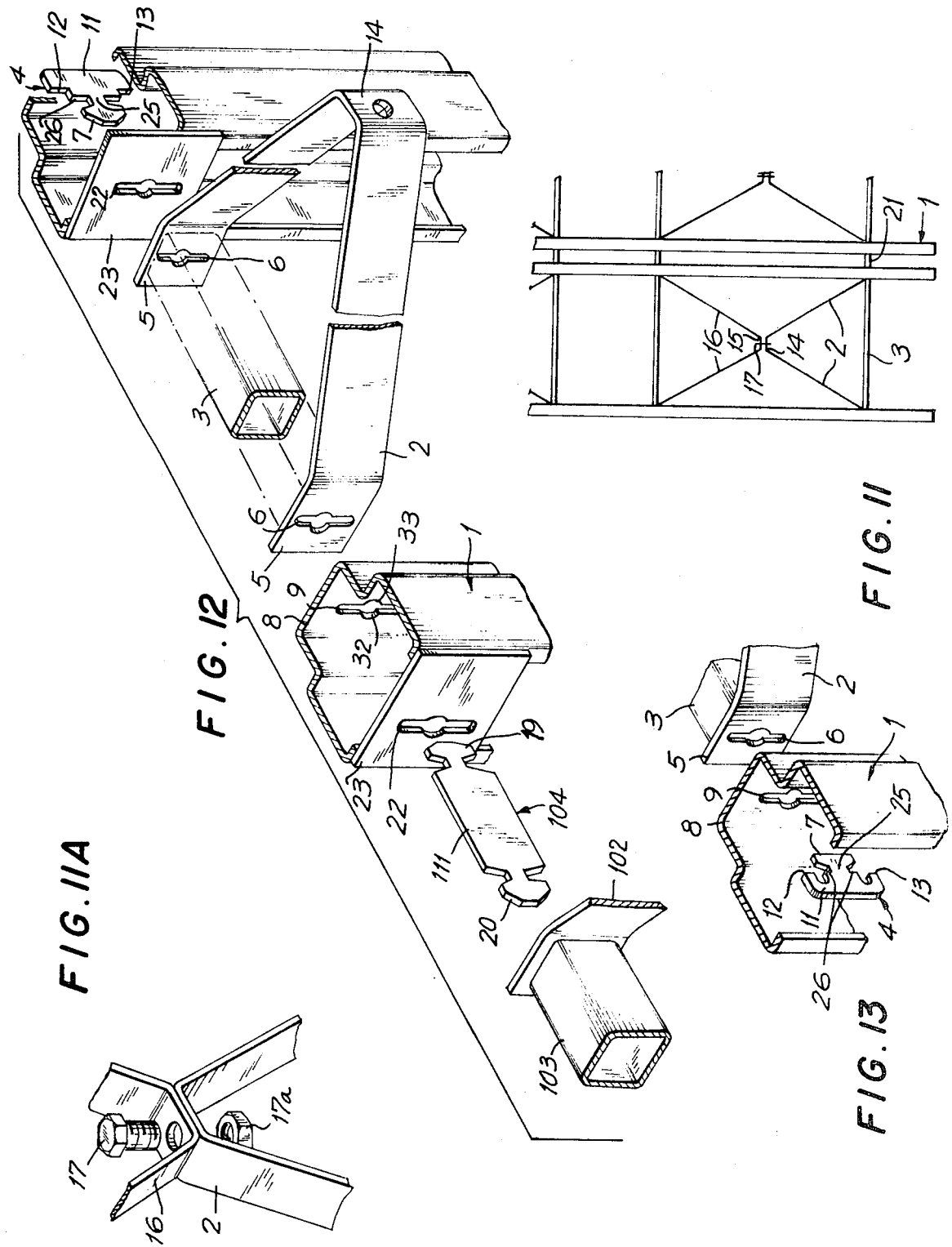

LATCH FOR DETACHABLY CONNECTING STRUCTURAL PARTS

BACKGROUND OF THE INVENTION

1. Field of the Invention

This invention relates to storage racks in which horizontal and diagonal braces are detachably connected by latches to uprights.

2. Description of the Prior Art

In known storage racks the latches for detachably connecting horizontal and diagonal braces to uprights often become loose when subjected to upwardly directed vertical forces, as by a fork lift, for example, which is objectionable.

SUMMARY OF THE INVENTION

It is an object of my invention to provide an improved latch for detachably connecting structural parts. I accomplish this by forming in the walls of a pair of structural parts non-circular openings, such as elongated slots, for example, which are of generally similar shape. The structural parts are detachably connected by my improved latch having a body and catch separated therefrom by a connecting neck portion.

When the walls of the parts overlie one another and the openings therethrough are in alignment and coincide, the latch is in an operative position after the catch has been moved through both of the openings in the parts and a projecting wall section of the body has been moved into the opening of one part. When in such operative position the latch functions to detachably connect the parts after they have been moved relative to one another through an angle of about 90°.

BRIEF DESCRIPTION OF THE DRAWING

FIG. 11 is a view diagrammatically illustrating a storage rack having uprights and horizontal and diagonal braces detachably connected together by latch structure embodying the invention;

FIG. 11A is a fragmentary perspective view of details diagrammatically illustrated in FIG. 11;

FIG. 12 is a fragmentary exploded perspective view of uprights and horizontal and diagonal braces of a storage rack adapted to be detachably connected together by latch structure embodying the invention and like that shown in FIGS. 1 and 4; and FIG. 13 is a fragmentary exploded perspective view of an upright and horizontal and diagonal braces adapted to be connected together by latch structure embodying the invention and like that shown in FIG. 1.

DESCRIPTION OF THE PREFERRED EMBODIMENT

Figure 1:
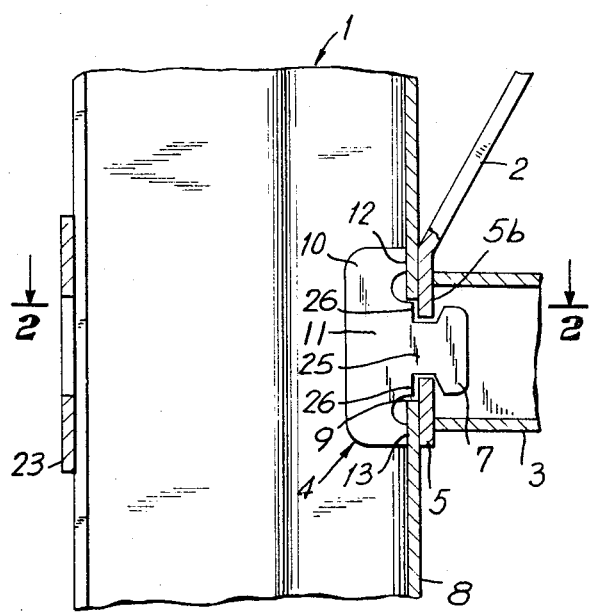
FIG. 1 is a vertical sectional view, taken at line 1—1 of FIG. 2, illustrating latch structure embodying my invention for detachably connecting a diagonal brace and a horizontal brace to an upright.
Figure 2:
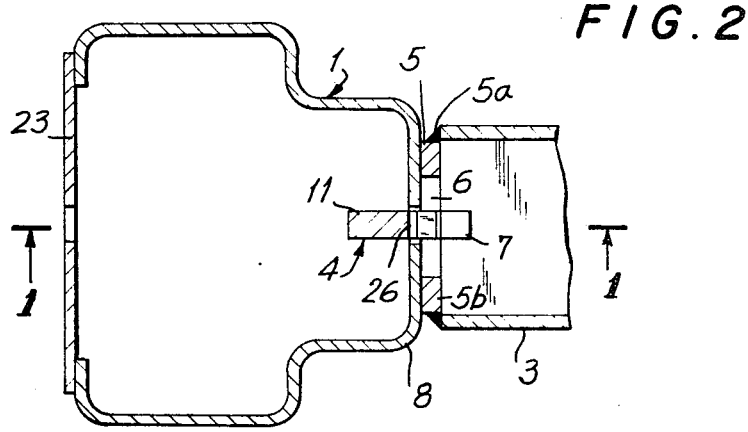
FIG. 2 is a horizontal sectional view taken at line 2—2 of FIG. 1.

Referring to FIGS. 1 and 2 of the drawing, I have shown my invention in connection with a storage rack having an upright 1 and a hollow horizontal brace 3 of rectangular form and a diagonal brace 2. The upright 1 generally is of U-shape in section and the closed or front end 8 of which is narrower than its rear open end. A reinforcing plate 23 is removably fixed in any suitable manner (not shown) to the flanges at the rear open end of the upright.

The horizontal brace 3 at its end bears against the outer end section 5 of the diagonal brace 2 and is welded thereto at 5a. As seen in FIG. 12, the horizontal brace 3 and diagonal brace 2 form a unit which is of triangular form having a closed end or tip 14 from which the arms of the brace spread outward toward their outer end sections 5.

In accordance with my invention I provide a latch structure 4 for detachably connecting the diagonal and horizontal braces 2 and 3 to the upright 1. As seen in FIGS. 1 and 2, the latch structure 4 comprises a flat plate or key 11 having a neck portion 25 to which is fixed a catch or hook 7. The plate 11 is provided with bearing surfaces 12 and 13 which bear against the rear surface of the front end 8 of the upright 1 and limit the movement of the plate toward the right in FIG. 1.

Figure 6:
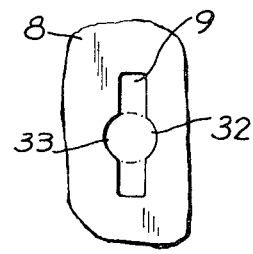
FIG. 6 is a fragmentary front elevational view of a part of the latch structure which is shown in FIGS. 1 and 2 and in FIGS. 4 and 5 and forms a part of the uprights.

The bearing surfaces 12 and 13 are located above and below a vertically extending opening 9 formed in the front end 8 of the upright 1, as best seen in FIGS. 1 and 6. Wall sections 26 on the plate 11, which define the left end of the neck portion 25, project into the top and bottom parts of the opening 9. In its latched position shown in FIG. 1 the neck portion 25 of the plate 11 of the latch structure 4 extends through a horizontal opening 6 formed in the outer end section 5 of the diagonal brace 2 and the catch or hook 7 is vertical and bears against the surface 5b of the brace 2.

A convenient way to connect the horizontal brace 3 and V-shaped diagonal brace 2 to an upright 1 is illustrated in FIG. 13, the shape of the brace 2 being more evident from FIG. 12. As shown in FIG. 13, the diagonal brace 2 is moved horizontally into the position illustrated with an outer end section 5 of the brace 2 at the front end 8 of the upright 1. In this position of the diagonal brace 2, the elongated opening 6 in the end section 5 of the brace 2 is vertical and can be moved closely adjacent to the front end 8 of the upright 1 so the vertical opening 6 is in alignment with and coincides with the vertical opening 9 in the upright 1.

Figure 3:
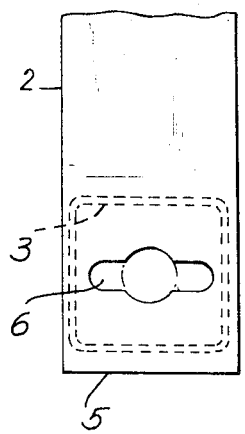
FIG. 3 is a fragmentary front elevational view of a part of the latch structure which is shown in FIGS. 1 and 2 and formed at the lower end of the diagonal brace.

The plate 11 of the latch structure 4 can then be inserted within the hollow upright 1 through its rear open end and the catch or hook 7 of the latch then moved through the vertically aligned openings 9 and 6 in the upright and brace 2. Thereafter, the diagonal brace 2 can be moved from its horizontal position in FIG. 13 to a vertical position like that shown in FIG. 11. This movement of the brace 2 shifts the opening 6 in the brace 2 from the vertical position shown in FIG. 13 to a horizontal position like that shown in FIG. 3, whereby the plate 11 of the latch structure 4 will be rendered operable to connect the braces 2 and 3 to the upright 1.

By providing a pair of diagonal braces on a storage rack in the manner shown in FIG. 11 in which the tips or closed ends 14 and 15 of a pair of V-shaped braces 2 and 16 abut one another and the arms of the vertically disposed braces 2 and 16 extend downward and upward, respectively, from the abutting tips 14 and 15, a single capscrew 17 and tightening nut 17a, as shown in FIG. 11A can be effectively employed to connect the tips 14 and 15 and keep the diagonal braces 2 and 16 in a vertical position on the storage rack.

Figure 4:
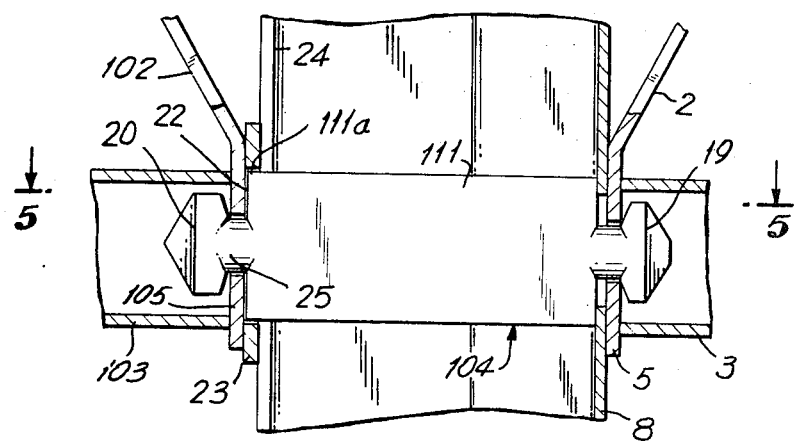
FIG. 4 is a vertical sectional view of latch structure, taken at line 4—4 of FIG. 5, which is similar to FIG. 1 and illustrates another embodiment of the invention.
Figure 5:
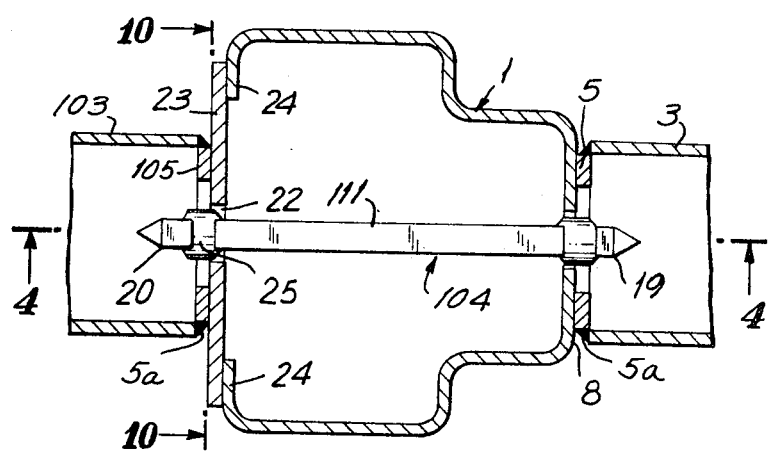
FIG. 5 is a horizontal sectional view taken at line 5—5 of FIG. 4.

In FIGS. 4 and 5 I have shown another embodiment of my invention having braces 2 and 3 and an upright 1 similar to the corresponding parts in FIGS. 1 and 2. In FIGS. 4 and 5 the braces 2 and 3 are detachably connected to the upright 1 by latch structure 104 comprising a plate 111 provided with catches or hooks 19 and 20 at its opposite ends. The hook 19 at the forward end of the plate 111 is like the catch or hook 7 in FIGS. 1 and 2 and functions in the same manner as the catch 7.

Figure 10:
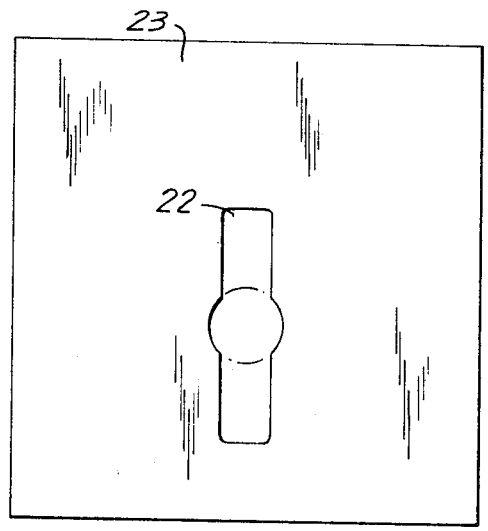
FIG. 10 is a fragmentary elevational view, taken at line 10—10 of FIG. 5, of the closure plate at the rear of the upright with the latch omitted.

The catch 20 at the rear end of the plate 111 can be employed to detachably connect to the rear of the upright 1 a diagonal brace 102 and a horizontal brace 103 in the same way that the braces 2 and 3 are connected to the front end 8 of the upright 1. The rear closure plate 23 is provided with a vertical opening 22, as shown in FIGS. 4, 5, and 10. The opening 22 receives the extreme left-hand end 111a of the plate 111. The neck portion 25 and catch or hook 20 project from the plate beyond the opening 22 in the rear closure member 23.

Figure 7:
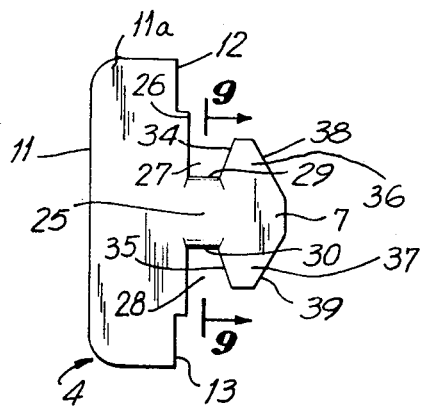
FIG. 7 is a side view of a latch similar to the latch shown in FIG. 1.
Figure 9:
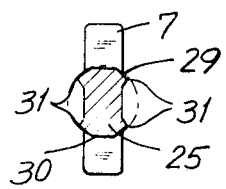
FIG. 9 is a sectional view taken at line 9—9 of FIG. 7.
Figure 8:
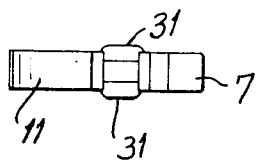
FIG. 8 is a top plan view of the latch shown in FIG. 7.

In FIGS. 7, 8, and 9, I have shown latch structure 4 generally like that illustrated in FIGS. 1 and 2. In FIG. 7 the plate 11 comprises a section 11a having the bearing surfaces 12 and 13 which bear against the inner surface of the front end 8 of the upright 1. Further, the plate 11 being described includes a shoulder 26 or projecting wall section which defines the left end of the neck portion 25 and extends into opening 9 in the front end 8 of the upright 1.

Top and bottom recesses 27 and 28 are formed at the neck portion 25 between the shoulder 26 and catch or hook 7. The bottoms 29 and 30 of the recesses 27 and 28 are defined by the neck portion 25 and are curved and of convex form, as seen in FIG. 9. Further, the curved bottoms 29 and 30 of the recesses project laterally from the opposing side or surfaces of the plate 11 to form segments 31 of a circle which are parallel to the axis of symmetry of the plate 11. The circle segments 31 extend through the center region of the elongated opening 9 in the front end 8 of the upright 1. The long sides of the opening 9, at the center region thereof, are formed with recesses 32 and 33 which also are segments of a circle and in which the circle segments 31 of the neck portion are journaled and fit exactly. With this construction displacement between the end part 5 of the diagonal brace 2 and the latch structure 4, in a plane perpendicular to the axis of symmetry of the latch structure, is prevented, whereby a firm connection between the latch structure 4 and the braces 2 and 3 is effected.

As seen in FIG. 7, the recesses 27 and 28 are wider at their outer ends than at their bottoms 27 and 28. The inner surfaces 34 and 35 of the hook or catch 7, which define the right-hand walls of the recesses 27 and 28, slope toward the bottoms of the recesses. The sloping surfaces 34 and 35 desirably are at an angle of about 20° from a vertical plane perpendicular to the axis of symmetry of the latch structure 4.

The arms 36 and 37 of the hook 7, which project upward and downward from the neck portion 25, taper conically outward from the end of the latch structure 4. This is so because the outer faces or surfaces 38 and 39 of the arms 36 and 37 slope toward the axis of symmetry of the latch structure 4.

It will be understood that the catches or hooks 19 and 20 in the plate 111 and the openings 9 and 22 in the front end 8 and rear closure plate 23 of the latch structure 104, which are shown in FIGS. 4, 5, 6, and 10 and described above, are formed in the same way that the corresponding parts are formed in FIGS. 7, 8, and 9, as just explained in detail.

In FIG. 12 I have illustrated one manner of practicing the invention to form a side section or so-called vertical unit of a storage rack. In FIG. 12 the uprights 1 can be placed on a plane supporting surface at a suitable distance from one another with their sides against the surface. The right end of a horizontal brace 3, which is welded to an end section 5 of a diagonal brace 2, is positioned against the rear closure plate 23 of the right upright 1, the brace 3 being perpendicular to the closure plate 23.

The left end of the horizontal brace 3 and end section 5 of the diagonal brace 2 to which it is welded, is positioned at the front end 8 of the left upright 1. While the diagonal brace 2 is held in the horizontal position illustrated in FIG. 12, a plate 11 within the right upright 1 is moved so that the hook or catch 7 will pass through the vertically aligned openings 22 and 6 in the rear closure plate 23 and end section 5 of the diagonal brace 2.

A plate 111 having catches or hooks 19 and 20 is moved forward through an opening 22 in a rear closure plate 23 of the left upright 1, so that the catch 19 will pass through the aligned openings 9 and 6 in the front end 8 of the right upright 1 and the end section 5 of the brace 2. A horizontal brace 3 and diagonal brace 2 can be connected to the catch 20 in the manner shown in FIG. 4. Thereafter, each of the diagonal braces 2 can be moved from its horizontal to its vertical position through an angle of 90° to detachably connect the braces 2 and 3 to the uprights 1 in the same manner described above in connection with the embodiments of FIGS. 1 and 4.

In view of the foregoing, it will now be understood that I have provided improved latch structure for detachably connecting parts of a storage rack and other structural shapes. As seen in FIGS. 1 and 2, the walls of parts 1 and 2 of the storage rack overlie one another with the plate or body portion 11 of the latch structure 4 and catch 7 at opposite sides of the walls and the connecting portion 25 at the openings 6 and 9 therein. The catch 7 is insertable into the openings 9 and 6 and removable therefrom in a first position of the parts 1 and 2 with respect to one another with the openings in alignment, as best shown in FIG. 13. As shown in FIG. 1, the plate or body portion 11 has projecting wall sections 26, the opening 9 in the wall of the upright or part 1 receiving the projecting wall sections.

The parts 1 and 2 are relatively movable with respect to one another through an angle of about 90° between the first position with the openings 6 and 9 in alignment, as seen in FIG. 13, and a second position with the openings out of alignment, as best seen in FIGS. 1 and 2. The parts 1 and 2 are detachably connected between the plate or body portion 11 and the catch 7 of the latch structure 4 in the second position of the parts 1 and 2 with respect to one another with the openings 6 and 9 out of alignment and perpendicular to one another.

I claim:

1. In combination,
   a. first and second parts, such as an upright and a brace of a storage rack, for example,
   b. each of said parts including a wall having a non-circular opening extending therethrough, the openings being of generally similar shape,
   c. latch structure comprising a body portion and a catch and a connecting portion therebetween of reduced cross-sectional area,
   d. the walls of said first and second parts overlying one another with said body portion and said catch at opposite sides of said walls and said connecting portion at the openings therein, said catch being insertable into the openings and removable therefrom in a first position of said parts with respect to one another with the openings in the walls in alignment,
   e. said body having a projecting wall section, the opening in the wall of one of said parts receiving said projecting wall section, and
   f. said first and second parts being relatively movable with respect to one another through an angle of about 90° between said first position with the openings in the walls in alignment and a second position with the openings out of alignment, said first and second parts being detachably connected between said body portion and said catch of said latch structure in the second portion of said parts with respect to one another with the openings in the walls out of alignment.

2. The combination set forth in claim 1 in which said connecting portion of said latch structure is formed with at least diametrically opposite peripheral surfaces of concave form in a plane transverse to its axis, and the non-circular opening in said other part being in the form of an elongated slot having sector-shaped recesses intermediate the ends of the long sides thereof in which said connecting portion is journaled.

3. The combination set forth in claim 2 in which the axial length of said connecting portion is as long as the thickness of said other part at the opening extending therethrough plus at least a part of the thickness of said one part at the opening extending therethrough.

4. The combination set forth in claim 1 in which said catch comprises hook-like parts having an outer surface of conical form.

5. The combination set forth in claim 1 in which
   a. said first part includes a second wall,
   b. a third part having a wall,
   c. the second wall and the wall of said third part each having a non-circular opening extending therethrough, the last-mentioned openings being of generally similar shape,
   d. said catch constituting a first catch extending from one end of said body portion,
   e. said latch structure including a second catch extending from the opposite end of said body portion and a connecting portion therebetween of reduced cross-sectional area,
   f. the second wall of said first part and the wall of said third part overlying one another with the opposite end of said body portion and said second catch at opposite sides of said walls and said connecting portion therebetween at the openings therein, said second catch being insertable into the last-mentioned openings and removable therefrom in a first position of the second wall of said first part and the wall of said third part with respect to one another with the openings in the walls in alignment, and
   g. said first and third parts being relatively movable with respect to one another through an angle of about 90° between said first position with the openings in the walls in alignment and a second position with the openings out of alignment, said first and third parts being detachably connected between the opposite end of said body portion and said second catch of said latch structure in the second position of said first and third parts with respect to one another with the openings in the walls out of alignment.

* * * * *